United States Patent
Hofer

[11] 3,921,376
[45] Nov. 25, 1975

[54] SNAP-ON TINE TOOTH
[76] Inventor: Walter David Hofer, Box 580, Pincher Creek, Canada
[22] Filed: July 29, 1974
[21] Appl. No.: 492,540

[52] U.S. Cl. ................................ 56/400; 56/400.21
[51] Int. Cl.² ........................................ A01D 77/00
[58] Field of Search .......... 56/400, 400.21, 291, 98; 198/198, 200, 168, 172, 173, 174, 175, 176

[56] References Cited
UNITED STATES PATENTS

| | | | |
|---|---|---|---|
| 3,226,922 | 1/1966 | Luther et al. | 56/400 |
| 3,269,523 | 8/1966 | Creswell | 198/173 |
| 3,626,678 | 12/1971 | Quam | 56/400 |
| 3,698,172 | 10/1972 | Johnston | 56/400 |
| 3,699,757 | 10/1972 | Hulburt | 56/291 |
| 3,834,140 | 9/1974 | Delfino | 56/400 |

Primary Examiner—Louis G. Mancene
Assistant Examiner—James D. Hamilton

[57] ABSTRACT

There is provided a flexible tine tooth having a snap-on base strip made possible by there being a laterally extending base flange on the base of the tooth for locking upwardly against an underside of a turbine belt through which the shaft of the tine tooth has been inserted upon which a snap-on aperture strip is pressed threadable down over tine tooth shaft around an enlarged shaft portion thereof to snap beneath enlarged portions against an upper surface of combine belt, the snap on strip having oppositely directed opposing flanges yieldable against the outward pressure of the enlarged shaft portion to thereafter snap downwardly under the edges of the enlarged shaft portions but to be removable by mere insertion of a screw driver blade or the like into a slot on either side of the locking flange to flip upwardly the flange for release of the locking strip from the tine tooth shaft, a stablizing-feature of the lock-strip being downwardly extending flanges from lower face thereof for pressing downwardly on the combine belt to securely lock the belt fixedly around the upper peripheral surfaces of the face flange which preferably is of a smaller lateral dimension than that of the lock strip as measured from the shaft.

3 Claims, 5 Drawing Figures

SNAP-ON TINE TOOTH

This invention relates to combine teeth and the attaching mechanism associated problems of such teeth.

BACKGROUND TO THE INVENTION

Prior to the present invention, there has existed major problems in the shearing of teeth of combine belt as well as in the difficulty of removing broken teeth and replacing thereof conconveniently and economically. While overcoming these problems it is equally desirable that the tine tooth be sturdily mounted to avoid undue shifting thereof to and fro.

BROAD DESCRIPTION OF THE INVENTION

Accordingly, objects of the present invention includes the overcoming of one or more problems and difficulties of the type referred to above, together with obtaining novel advantages not heretofore available.

Another object is to obtain novel mechanism of anchoring securably irrespective one or more, particularly based-apart tine-teeth to a combine belt while concurrently obtaining a flexibility which decreases the possibility of shearing the tine while nevertheless retaining sufficient stiffness in the mounting thereof as to retain a high level of operational efficiency.

Other objects become apparent with the preceeding and the following disclosure.

One or more objects of the present invention obtained by the invention is defined herein.

Broadly the invention includes a combine-tooth and locking strip utilizable therewith, the tine tooth having preferably a base flange of substantially rectangular shape extending laterally from the bottom of a tine tooth shaft and with the tinetooth and shaft extending upwardly a distance and thereafter enlarging by oppositely extending shaft flanges as an enlarged shaft cross-section with the distance between the enlarged shaft flange and the base fiange being predetermined to be equal to thickness of the combine belt plus the thickness of the locking strip; the locking strip includes a through aperture with through free-space defined between opposingly directed flanges of the locking strip with the respective flanges, at least one thereof relative to the free space, having a lateral slot preferably for the insertion of a screw driver or the like for the flipping upwardly thereof to release the flange from beneath the enlarged portion of the shaft when the tine tooth is in a locked state. Accordingly, it is possible to insert the distal end of the tine tooth upwardly from lower base of a combine belt through a hole therein and to place thereafter the locking strip onto the distal end of the tine tooth, slide it downwardly and over the enlarged portions with the lock strip flanges at that point flexing upon one another, and snapping inwardly under the enlarged portion of the shaft flanges to thereby securely detachably lock the tine tooth into a secure position. The tine tooth is held securely against to and fro undesirable shifting or wobbling by virtue of a downwardly extending flange from a peripheral lower edge of the locking strip and with the locking strip preferably of an area larger than base flange such that the downwardly extending locking strip ridge thereto locks around the base flange pinning the belt therebetween and securing the tine tooth into a sturdy state. Concurrently, there is provided nevertheless sufficient flexibility as to permit some degree of flexing of the tine tooth to and fro responsive to the striking of large or unyielding objects such as rocks or the like, thereby avoiding substantially the possibility of snapping off the tine tooth. Similarly, the nature of the tine tooth provides for some degree of flexing of the tine tooth above the enlarged strip-securing portions of the shaft.

The tine tooth composition preferably is of a semi-rigid composition such as plastic or metal or the like, of any suitable conventional plastic or metal having these properties. The enlarged portion of the shaft referred to herein as the shaft locking flanges preferably are arced in shape on their lower surface allowing for ease of flexing upwardly the terminal ends of the opposing locking strip flanges for the removable of the strip by insertion of a screw driver or the like, inserting its blade into a free-space slot at one end edge of the flange in order to flip upwardly the flange, by virtue of the present invention, therefor there is provided merely a two-piece unit, namely the tine tooth with its base flange extending preferably radially outwardly but of squared shape preferably, and with a arcing strip having a central aperture therein and preferably of a correspondingly squared shape but slightly larger than the base flange and having outwardly extending rigid flanges thereof for locking downwardly around the base flange to pin the belt of the combine therebetween is provided accordingly at low cost of production with high efficiency and durability. The tine belt is of any conventional type, while the tooth is preferably of relative rigid but semi-flexible material as noted above. The semi-flexible nature of the strip and of the shaft material itself also serves to facilitate the insertion of the tine tooth to the locking strip and the locking of the tooth into a locked state onto the combine belt. While not being of any complicated structure nor of expensive construction, the tine tooth of the present invention is more expendable cost-wise when major wear and tear or blows render tine tooth unusable. Similarly, the shape and structure of the tine tooth is sufficiently simple as to facilitate low cost and the manufacture in molding thereof. Another major advantage of the present invention is its adaptability used to presently existing operational combines and belts thereof.

The invention may be better understood by reference to the FIGS. as follow:

Figure 1:
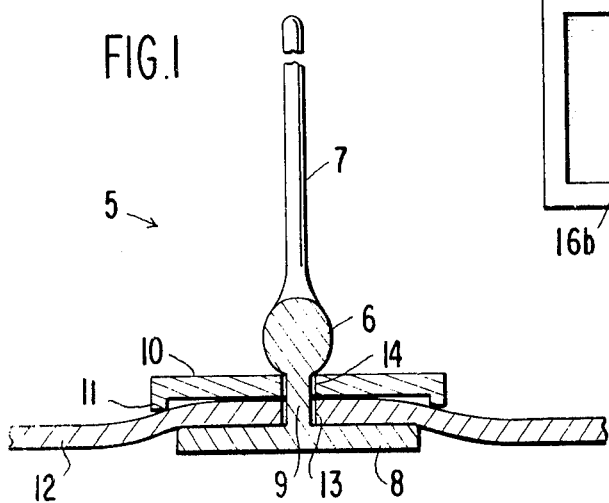
FIG. 1 illustrates a cross-sectional view shown in an in-part view as taken laterally across and vertically of the tine-tooth and its neck portion and base as mounted through a combine belt and anchor thereto by the snap-on the clip also disclosed in cross-sectional.
Figure 4A:
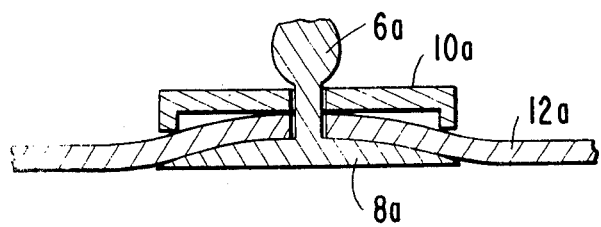
Figure 4B:
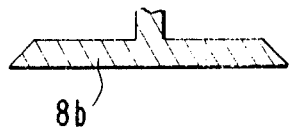

FIG. 4A illustrates an alternate embodiment of the invention shown in side cross-sectional view as viewed from the rear of the tine-tooth, comparable to view of FIG. 1, this embodiment differing in the upper surface of the base of the tine-tooth which is curved arcuate in shape for facilitating a different type fit with the lower surface of the combine belt. FIG. 4B illustrates in the rear view cross-sectional side view, a still further alternate embodiment of the tine-tooth base shape.

DETAILED DESCRIPTION OF THE INVENTION

Figure 2:
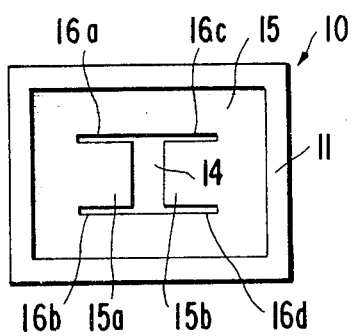
FIG. 2 illustrates a bottom elevation plan view of the sanp-over clip of the type shown in the mounted state in FIG. 1.
Figure 3:
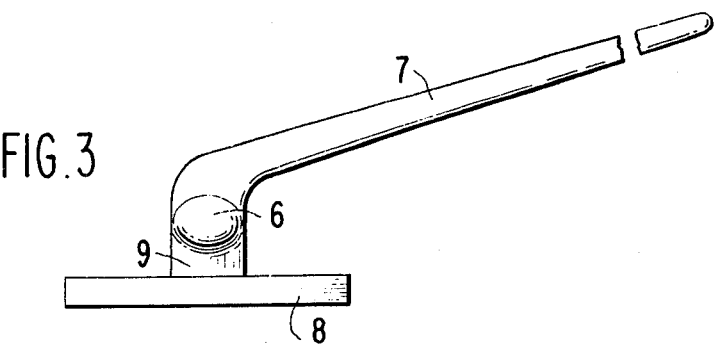
FIG. 3 illustrates a side elevation view of the tine-tooth and its neck and base of the type illustrated in FIG. 1.

In greater details, FIG. 1, 2 and 3 are all directed to the same basic embodiment of the invention and disclose a combination 5 of a tine tooth 7 and a snap-over clip 10 mounted on the upper neck 9 of the tine-tooth below an enlarged flange portion 6, with the snap-over clip serving to brace the tine tooth 7 by virtue of its binding and pressing action upon the belt 12 against an upper surface of the tine tooth base flange 8 as illustrated in FIG. 1 in which the tine tooth neck is inserted through the combined belt aperture 13 and thereafter the clip aperture 14 is threaded by the tine tooth itself and the snap-over clip snapped downwardly over the enlarged flanged portion 6. In a further facilitating of the binding and bracing nature of the snap-over clip 10, there are downwardly directed bracing flanges or ridges 11 which presses downwardly on the upper surface of the combine belt as well as the downward pressure causing the snap-over clip edges adjacent the hold 14 to more firmly bind the neck 9 of the tinetooth 7.

The relation of the snap-over clip may be better seen and understood by reference to the bottom plan view thereof of FIG. 2 in which the aperture 14 is designed by at least one preferably the illustrated two oppositely opposing snap-over clip flanges 15a and 15b which allow the aperture 14 to be expanded during the process of snapping it over the enlarged tine tooth flange portion 6 of FIG. 1. In the FIG. 2 embodiment, is shown that in at least one edge of the flange 15a and 15b, preferably both edges of each flange, are defined by a wide slot such as 16a, 16b, 16c, or 16d providing ample opportunity for the insertion of the bladed end of a screw driver in order to prize-up the flange easily for easy removal of the snap-over clip from the mounted state such as that shown in FIG. 1. Additionally in the FIG. 2 bottom plan view, there is shown the main bottom face 15 as well as the downwardly directed circumscribing rigid 11 also illustrated in FIG. 1.

FIG. 3 illustrates the same tine tooth as that of FIG. 1 in a side elevation view for improving the understanding of a typical shape thereof, including the overall tine tooth 7, the enlarged flange neck portion 6, and the neck portion 9 and the base flange 8.

FIG. 4A and 4B illustrates alternate embodiments also illustrated in cross section, differing from the embodiment of FIG. 1 only in that the FIG. 4A flang 8A has an arcuate upper surface and whereas the base flange 8B has a sharp-angled peripheral edge defining an angle greater than 90°, it being a fact that some types of or shapes of base flanges hold better on one type of combine belt than on another, depending upon the material out of which the combine belt is made, the thickness and wear of thereon previously, and other such factors.

It is to be understood that it is within the scope and skill and purpose of the present invention to make such modifications and variations and substitution of equivalents as would be apparent to a person of ordinary skills.

What is claimed is:

1. A combine detachable tine tooth device comprising in combination: a combine tooth having a central shaft and having a transversely laterally extending integral base flange extending in each of opposite directions away from the shaft, the central shaft extending axially and being shaped (a) to include a bend at a first location intermediate of the shaft's axial length, the bend being spaced a first predetermined distance from the base flange, and (b) to include at a second location intermediate between the base flange and the bend, a locking flange means for locking a flange-key therebeneath against a belt located on an upper face of the base flange, the locking flange means including locking flange structure extending laterally outwardly from the shaft; a separate base-strip element having upper and lower substantially flat faces with downwardly directed pressure flange at substantially outer peripheral edges of the base-strip element's lower flat face, the base-strip element including a throughspace about centrally of the upper and lower flat faces, and the base-strip element having a first flap extending toward and partially defining the through-space, the through-space being substantially equal to a cross-section of the shaft at a point in juxtaposition to and beneath the locking flange means, such that upon insertion of the shaft upwardly through the aperture of the combine-tooth-mounting belt and thereafter upwardly through the through-space, the first flap is flexed backwardly by virtue of of pressure of the locking flange means such that the base-strip element's first flap is snapable beneath the locking flange means into a detachable locked state in which the base strip element is pinned downwardly against an upper surface of the combine belt with the belt locked between the base flange's upper face and a lower face of the base strip element.

2. A combine detachable tine tooth device of claim 1, including a second flap further partially defining the through space and extending in a substantially opposite direction and in opposing relationship to the first flap, defining the through space between opposing terminal ends of the first and second flaps.

3. A combine detachable tine tooth device of claim 2, including a free space slot along a side edge of each of the frist and second flaps.

* * * * *